(12) United States Patent
Chu et al.

(10) Patent No.: US 9,916,850 B1
(45) Date of Patent: Mar. 13, 2018

(54) LASER BIAS CURRENT CONTROL

(71) Applicant: Seagate Technology LLC, Cupertino, CA (US)

(72) Inventors: Alfredo Sam Chu, Prior Lake, MN (US); Robert Matousek, Berthoud, CO (US); Todd Michael Lammers, Lafayette, CO (US); Thomas Lee Schick, Arvada, CO (US); Wenzhong Zhu, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/375,368

(22) Filed: Dec. 12, 2016

Related U.S. Application Data

(60) Provisional application No. 62/377,518, filed on Aug. 19, 2016.

(51) Int. Cl.
*G11B 5/02* (2006.01)
*G11B 5/00* (2006.01)
*G11B 7/1263* (2012.01)

(52) U.S. Cl.
CPC .... *G11B 7/1263* (2013.01); *G11B 2005/0021* (2013.01)

(58) Field of Classification Search
CPC ... G11B 13/04; G11B 2005/0001; G11B 5/02; G11B 5/455; G11B 2007/0006; G11B 7/00736; G11B 7/1263; G11B 7/1267; G11B 7/126; G11B 20/10027; G11B 20/10351; G11B 7/0045

USPC ............ 360/46, 67, 65, 66, 68; 230/86, 271, 230/282, 291, 302; 330/282; 369/120, 369/121, 47.5

See application file for complete search history.

(56) References Cited

U.S. PATENT DOCUMENTS

| | | |
|---|---|---|
| 5,093,660 A | 3/1992 | Beauducel |
| 5,235,575 A | 8/1993 | Han |
| 5,668,470 A | 9/1997 | Shelor |
| 5,726,821 A | 3/1998 | Cloke et al. |
| 6,122,127 A | 9/2000 | Flinsbaugh |
| 6,288,863 B1 | 9/2001 | Flinsbaugh |
| 6,532,391 B1 | 3/2003 | Nayler |
| 6,538,833 B2 * | 3/2003 | Choi ............... G11B 5/012 330/282 |

(Continued)

*Primary Examiner* — Nabil Hindi
(74) *Attorney, Agent, or Firm* — Cesari & Reed, LLP; Kirk A. Cesari; Logan Brown

(57) ABSTRACT

A preamplifier circuit can include a control line dedicated to receive a control signal that corresponds to indicating a specific register of the preamplifier circuit, which can allow the preamplifier to switch between utilizing two or more registers to control a current output of the preamplifier circuit. The preamplifier circuit may also have a serial input to program multiple registers of the preamplifier circuit in a serial fashion. In some embodiments, the current output may be a laser bias current. The preamplifier may adjust an output current that drives a laser emitter based on a control signal indicating which specific registers controls the output current. Further, a controller, such as a system-on-chip controller, may selectively vary the control signal to affect the current output of the preamplifier circuit. These systems and methods may be particularly useful for lasers and heat-assisted magnetic recording (HAMR).

19 Claims, 4 Drawing Sheets

(56) References Cited

U.S. PATENT DOCUMENTS

| | | | |
|---|---|---|---|
| 6,856,195 B2 * | 2/2005 | Ranmuthu | H03F 1/56 |
| | | | 330/69 |
| 6,904,475 B1 | 6/2005 | Fairman | |
| 7,221,305 B2 | 5/2007 | Kim | |
| 7,787,206 B2 | 8/2010 | Yen | |
| 7,881,000 B2 | 2/2011 | Lee | |
| 8,711,502 B1 | 4/2014 | Wilson et al. | |
| 9,502,068 B1 * | 11/2016 | Haralson | G11B 7/1267 |
| 2002/0131193 A1 * | 9/2002 | Choi | G11B 5/012 |
| | | | 360/67 |

* cited by examiner

LASER BIAS CURRENT CONTROL

SUMMARY

In some embodiments, a device may comprise a preamplifier circuit including programmable registers to store bits that control functions of the preamplifier circuit and a first input dedicated to receive a first control signal indicating a specific register of the programmable registers to utilize for controlling a laser current output of the preamplifier circuit. The preamplifier circuit may also include a first control circuit configured to selectively change an amount of current at the laser current output of the preamplifier circuit based on the specific register, and a first output configured to provide the laser current output to a laser emitter. The device may also comprise a controller, coupled to the preamplifier circuit, including a second control circuit configured to selectively vary the first control signal to affect the laser current output, and a second output configured to provide the first control signal to the first input.

In some embodiments, a device may comprise a preamplifier circuit including programmable registers to store bits that control functions of the preamplifier circuit and a first input dedicated to receive a first control signal to indicate to the preamplifier a specific register of the programmable registers. The preamplifier circuit may also include a first control circuit configured to selectively change an amount of current at a laser current output of the preamplifier circuit based on the first control signal, and first output configured to provide the laser current output to a laser emitter.

In some embodiments, a method can comprise receiving a control signal at a dedicated control line input of a preamplifier circuit, the preamplifier circuit configured to indicate a specific register of a set of programmable registers of the preamplifier circuit in response to the control signal; receiving a serial programming signal at serial input of the preamplifier circuit, the preamplifier circuit configured to program multiple registers of the set of programmable registers of the preamplifier circuit in a serial fashion in response to the serial programming signal; and selectively switching an amount of current at a current output of the preamplifier circuit based on the specific register of the set of programmable registers.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Figure 1:
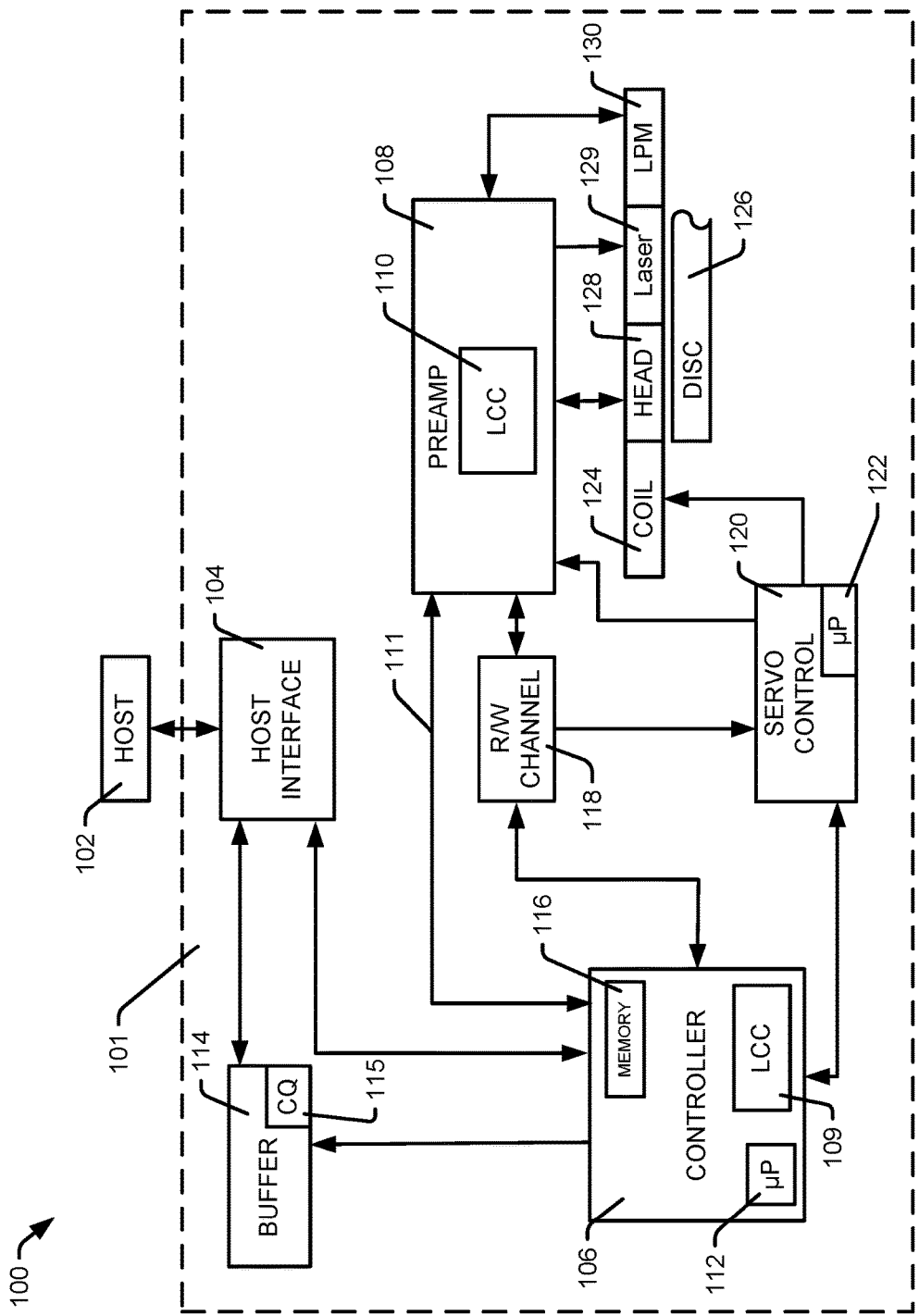
FIG. 1 is a block diagram of a system of laser bias current control, in accordance with certain embodiments of the present disclosure.

Referring to FIG. 1, a diagram of a system for laser bias current control is shown and generally designated 100, in accordance with certain embodiments of the present disclosure. Specifically, FIG. 1 provides a functional block diagram of an example data storage device (DSD) 101 and host 102. The DSD 101 may be a hard disc drive (HDD), a hybrid storage device, an optical storage device, or other type of storage device.

The DSD 101 can include one or more data storage mediums, such as one or more disc(s) 126, which can be a magnetic disc or an optical disc for data storage. Further, multiple discs may be included, and each storage surface of the discs 126 may have a respective laser emitter 129 and head 128, otherwise known as a transducer, having a write element and a read element that allow storage of data to the respective surface and reading of data from the surface. In some embodiments, the DSD 101 may be a heat-assisted magnetic recording (HAMR) device that utilizes the laser emitter 129 configured to heat an area of the disc 126 for the head 128 to write data to the heated area. Further, a surface of the DSD 101 may include multiple tracks for data storage, where each track is divided into multiple data sectors and multiple servo wedges.

In some embodiments, the DSD 101 can communicate with a host device 102 via a hardware and firmware-based interface circuit 104. The interface 104 may comprise any interface that allows communication between a host 102 and a DSD 101, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 104 may include a connector (not shown) that allows the DSD 101 to be physically removed from the host 102. In some embodiments, the DSD 101 may have a casing or housing containing the components of the DSD 101, or the components of the DSD 101 may be attached to the housing, or a combination thereof.

The DSD 101 may include a buffer 114, which may be volatile or nonvolatile memory, and a command queue 115, where the buffer 114 can temporarily store data during read and write operations, and the command queue (CQ) 115 can temporarily store multiple operations pending execution. Commands arriving over the interface 104 may automatically be received in the CQ 115 or may be stored there by controller 106, interface 104, or another component.

The DSD 101 can include a programmable controller 106, which can include associated memory 116 and processor 112. In some embodiments, the DSD 101 can include a read-write (R/W) channel 118, which can encode data during write operations and reconstruct user data retrieved from a memory, such as disc(s) 126, during read operations. A preamplifier circuit (preamp) 108 can apply write currents to the head(s) 128 and provides pre-amplification of read-back signals to the R/W channel 118. A servo control circuit 120 may use servo data to provide an appropriate current for the coil 124, which may be a voice coil motor (VCM), to position the head(s) 128 over a desired area of the disc(s) 126. The controller 106 can communicate with a processor 122 to move the head(s) 128 to the desired locations on the disc(s) 126 during execution of various commands, such as from the command queue 115.

Generally, during operation of the DSD 101 in a HAMR mode, the head can write data to data sectors while the laser 129 is powered on. However, the writer of the head 128 and the laser 129 must have powered reduced when they cross over each servo wedge to prevent overwriting of the servo information. During use of the laser 129, the emitted power may fluctuate based on various conditions such as amount of time the laser 129 is on, relative temperature, other environmental conditions, other factors, or any combination thereof. In a HAMR based recording device and other laser devices, the laser power can change relative to environmental conditions and can drift (e.g. exhibit changing variances in output power) over the laser lifetime. Specifically, heat can change the lasers threshold point (turn on) and the slope efficiency. To counteract this, a laser power monitor circuit 130 can be utilized to measure the power output of the laser 129 by providing an analog signal representative of such to the preamp 108. Then, a laser current provided from the preamp 108 to the laser 129 can be varied to provide a consistent laser output power. In some embodiments, the laser power monitor circuit 130 may include a photodiode configured to generate a signal representative of the laser output power. Further, a bolometer or a write coil or other resistive elements can provide a power feedback that is representative of the power or voltage of the laser, such as the power at a recoding surface.

The preamp 108 may include a laser current control circuit 110, which may be coupled to the controller 106 via a control line input 111. The control line input 111 may receive a control signal that determines a laser current output of the preamplifier circuit 108. The laser current control circuit 110 may selectively change an amount of current at the laser current output based on the control signal. For example, the laser current output may be switched between a lower bias level (e.g. 20% laser power) and a higher bias level (e.g. 70% laser power). The preamplifier 108 can provide the selected laser current at an output to the laser emitter 129.

The controller 106 may include a second laser current control circuit 109 that can selectively vary the control signal over the control line 111 to affect the laser's 129 current output. The controller 106 may provide the control signal at an output coupled to the control line 111 which may be coupled to a control line input of the preamplifier 108. In some examples, the control signal can be a logical combination of a write enable signal and a read power signal received at the preamplifier circuit. In further examples, the control signal can be a dedicated control line input (e.g. may or may not be used for other control functions and not used to program any registers) to the preamplifier circuit that switches the laser current output directly in response to the dedicated control line input. For example, the dedicated control line input could be a logic input to the preamplifier 108 that sets a hardware logic indicator as to which register to use to control the preamplifier 108 output. Further example embodiments of a preamp system with a laser current control line are provided in FIG. 2.

Figure 2:
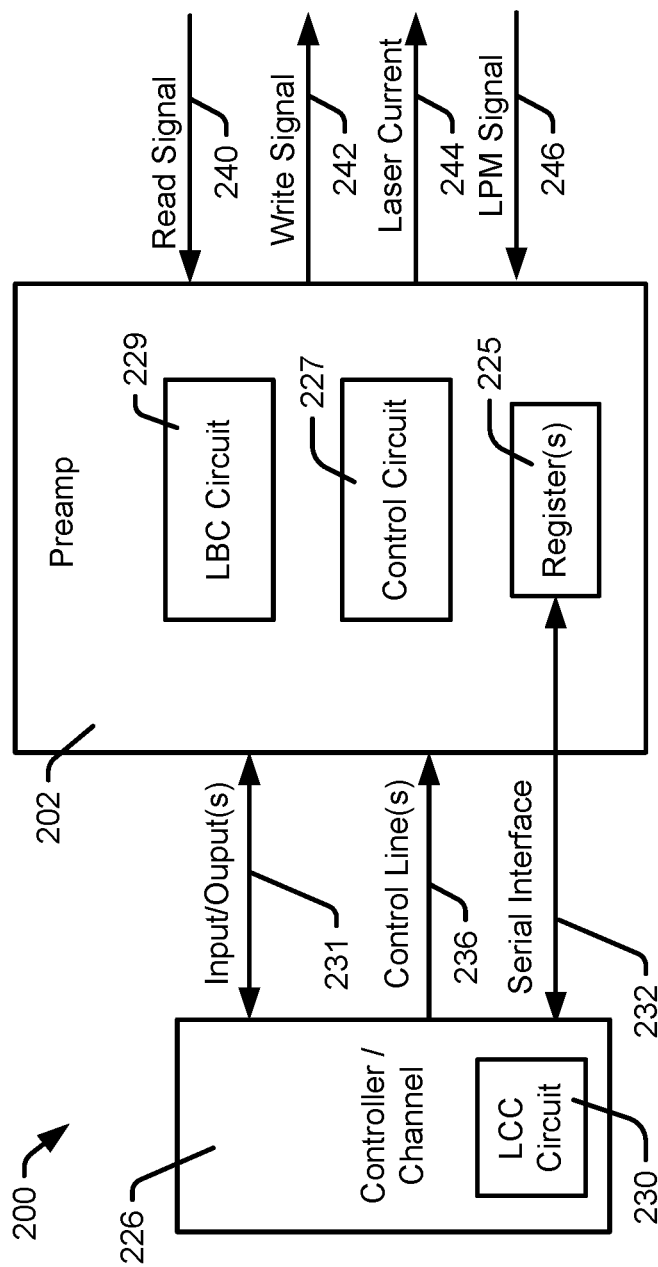
FIG. 2 is a block diagram of a system of laser bias current control, in accordance with certain embodiments of the present disclosure.

Referring to FIG. 2, a block diagram of a system for laser bias current control is shown and generally designated 200. The system 200 can include a preamplifier ("preamp") circuit 202 and a controller circuit 226. The controller 226 may be a data storage controller, processor, read/write channel, system-on-chip ("SOC"), application specific integrated circuit ("ASIC") or other device. The preamp circuit 202 can include one or memory registers 225, a control circuit 227, a laser bias current calibration circuit 229, input lines (e.g. 231), control line(s) from the controller (e.g. control line 236), an input 240 from a read head, an input 246 from a laser power monitor, an output 242 to a write element, and an output 244 to a laser emitter.

The controller 226 may send or receive signals, such as signal sample acquisition signals, power on/off signals, or other signals to the preamp 202 via input/output lines 231, control line(s) 236, or by a serial interface 232. For example, the controller 226 may include a laser current control circuit 230 that can selectively control the output 244 to the laser emitter via the control line 236 that is coupled from an output of the controller or channel circuit 226 to an input of the preamp 202. The laser current control circuit 230 can selectively vary the control signal over the dedicated control line 236 to affect the laser's current output, such as to switch between a lower laser bias current and a higher laser bias current, which may be accomplished with the dedicated control line 236 configured to change between multiple pre-programmed registers to change the laser bias current based on the values programmed in the registers that directly affect the laser bias current output.

The control circuit 227 may be coupled to the hardware control line 236 to receive the control signal from the channel or controller 226; control circuit 227 can include hardware logic circuitry to change the laser bias current based on the signal received over the dedicated control line 236. This allows the controller or channel to selectively change the laser bias via a dedicated external line (e.g. by acting as a pointer to determine which register will control the laser bias output and not used to program values into any register) without the need to program one of the preamplifier register settings in registers 225 via the serial interface 232. In some examples, the control signal can be a logical combination of a write enable signal and a read power signal received at the preamplifier circuit. In further examples, the control signal can be a dedicated control line input to the preamplifier circuit that switches the laser current output directly in response to the dedicated control line input. In some embodiments, the dedicated control line input 236 could be a logic input to the preamplifier 202 (e.g. preamp 108) that sets a hardware logic indicator as to which register to use to control the preamplifier 108 output. For example, there could be multiple registers that are pointed to the same preamplifier output, that is each of such multiple registers can affect the same preamplifier output, which the user or controller 226 may setup (e.g. program) the different registers with different values, and then the dedicated control line input 236 could be utilized by the controller 226 to switch between the different registers to control the output (e.g. the laser bias current). For whichever control line embodiment is implemented, the control circuit 227 can dictate which register selections will be used to control the laser bias current, based one or more external control lines.

For example, in some embodiments, the control line 236 can include the ability to determine which laser current register to use for the write enable signal (e.g. 404), the ability to determine which laser current register to use for the reader power signal (e.g. 406), or both. The control circuit 227 can be configured to logically determine when to use a certain register to change a bias current level of the laser in response to the control line(s), where the determination may be based on the control line input 236 which can provide an indication to the control circuit 227 to determine which of the programmable registers to use to control the bias current output 244 of the preamplifier 202.

In addition, the dedicated external control line 236 can be used to quickly switch between laser current bias signal levels, by switching laser bias control between preamp registers, (e.g. between Ibias normal & Ibias chopped) to create a modulated laser current from the preamplifier, which can be utilized with a laser bias current calibration routine to determine an output power of the laser. The use of the external control line allows for switching between two registers, providing a more accurate resolution of the modulation amplitude and smaller amplitude range available. Frequency range control is better than can be achieved by serial port programming of the two laser registers via the serial interface 232.

Figure 3:
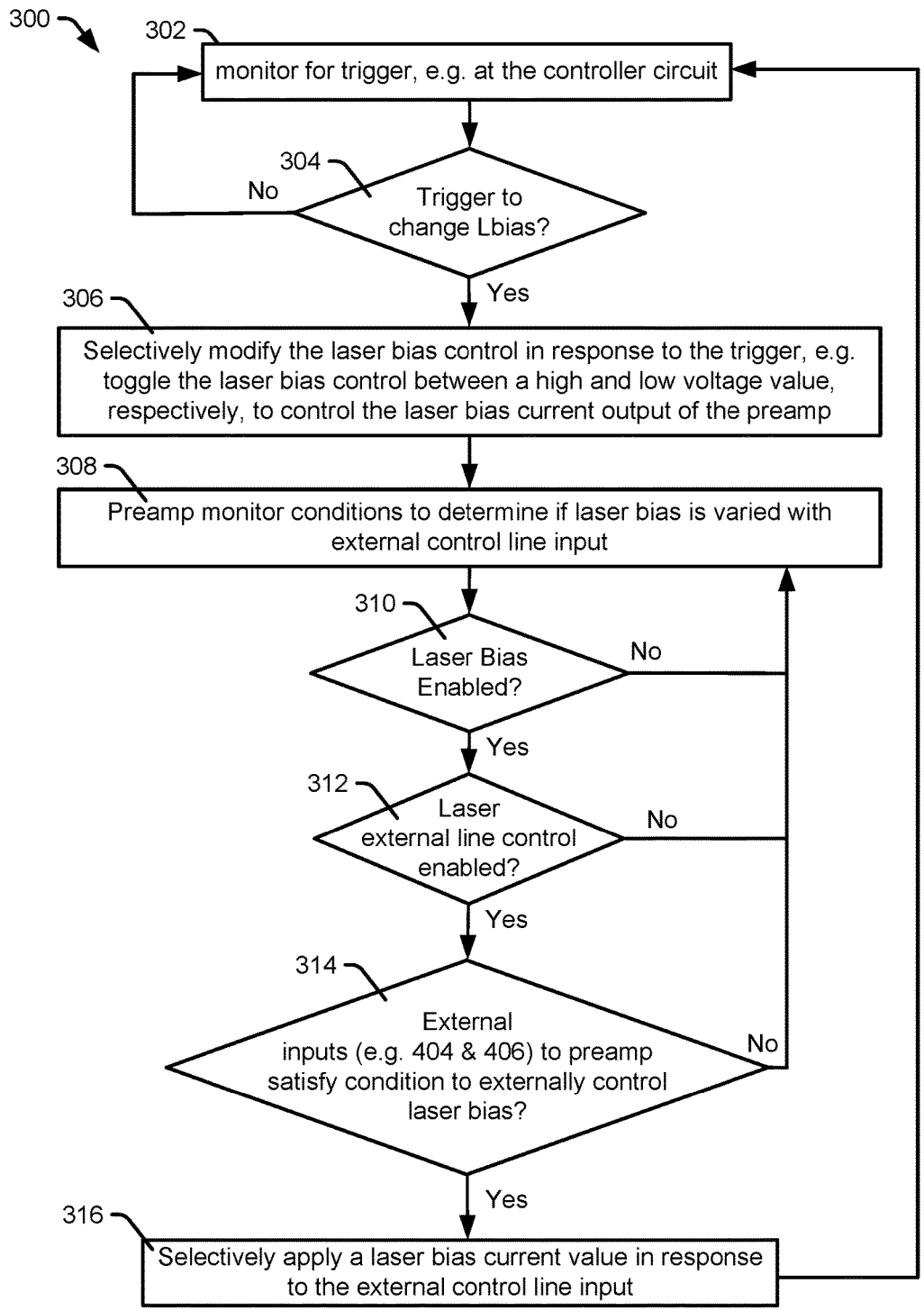
FIG. 3 is a flowchart of a method of laser bias current control, in accordance with certain embodiments of the present disclosure.

Referring to FIG. 3, a flowchart of a method of laser bias current control is shown and generally designated 300, in accordance with certain embodiments of the present disclosure. The method 300 may be performed by the systems 100 or 200, which can be achieved with a preamp circuit coupled via a control line to a controller circuit. Method 300 may be utilized to selectively change an output bias current of a preamplifier (e.g. preamp 108 or 202) based on a control line input from a controller (e.g. controller 106 or 226).

The method 300 may include monitoring for a trigger, at 302, to determine when the controller circuit should switch the control line from indicating a lower laser bias current to indicating a higher laser bias current, or vice versa. When a trigger occurs, at 304, the method 300 may include selectively modifying the laser bias control in response to the trigger, at 306. For example, the controller can toggle the laser bias control line between a high and low voltage value, respectively, to control the laser bias current output of the preamp. The preamplifier can receive the laser bias control line output of the controller circuit at the preamp control line input, at 314. By receiving the preamp control line input, the preamplifier can quickly switch one or more register settings that determine the laser bias current settings.

The preamplifier can continuously monitor for whether the condition(s) necessary to reduce the laser power, e.g chop the laser power, are present, at 314. When the conditions are not present (e.g. a laser enable bit is not set 310 or laser external control line is not enabled 312, which may be done via programming of other registers), the method may continue to monitor for another trigger event, at 302. When the condition(s) are present, the preamplifier can selectively apply a laser bias current value in response to the preamp control line input, at 316. The preamplifier may determine the laser bias current value by monitoring settings of one or more associated registers.

Figure 4:
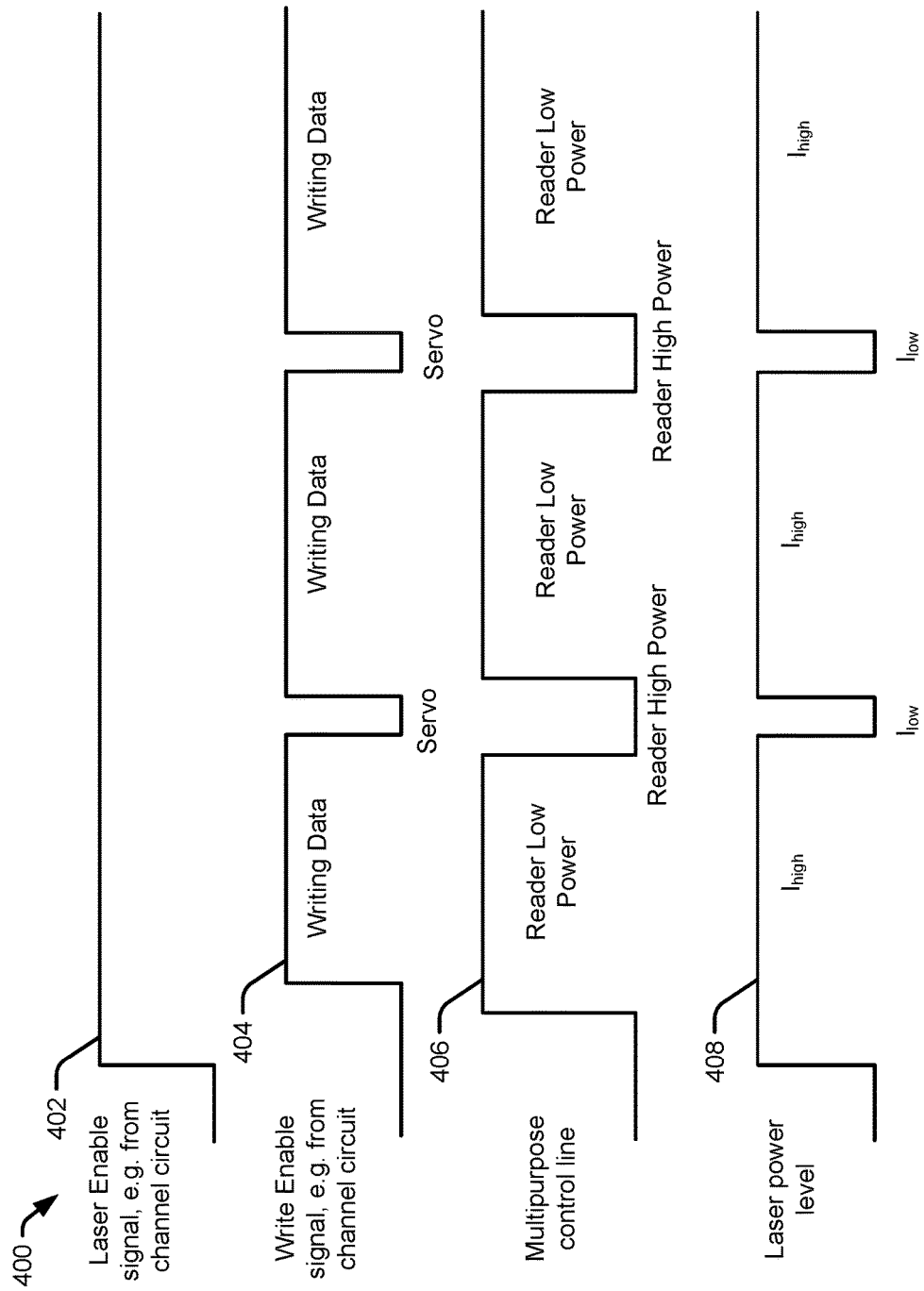
FIG. 4 is a timing diagram of a method of laser bias current control, in accordance with certain embodiments of the present disclosure.

In some embodiments, the laser bias control line input may comprise the control line inputs respective to signals 402, 404, and 406 of FIG. 4, that is a laser enable signal (e.g. a laser enable bit), a write enable signal, and a multi purpose control line may be used as the combination of conditions needed to determine the laser bias control. For example, the laser bias control may be determined based on hardware logic circuit(s) configured to determine when the laser enable signal is high and both the write enable signal and multipurpose control line are both low, such that when read mode is entered as the write enable signal goes low, the laser power level is reduced, as shown in signal 408; the hardware logic circuit in the preamp can switch to a laser bias register to reflect a change (e.g. a reduction) in laser power via reducing the laser bias current or vice versa (e.g. write enable signal goes high causing the laser bias current to increase). In most examples, the laser enable signal may be a programmable bit of the registers 225 that sets the laser enable bit.

In some embodiments, the laser bias control line input may comprise a laser power level control line from the controller 226, such as control line 236, where the laser level power is determined based on the laser power level control line from the controller 226.

Referring to FIG. 4, a timing diagram of a method of laser bias current control is shown and generally designated 400, in accordance with certain embodiments of the present disclosure. The timing diagram 400 provides a sample states in which a controller circuit can selectively control a preamplifier laser bias current output via a control line. For example, the systems 100 or 200 or the method 300 may be utilized to perform the methods of the timing diagram 400.

Signals 402, 404, and 406 are considered part of the system (e.g. system 100 or 200) controller's read channel's writer and laser controls. The channel circuit can control a laser enable bit in the preamp register (e.g. by signal 402), write enable control line (signal 404), and a multipurpose control line (signal 406) to a preamplifier. In some embodiments, a separate laser bias control line (signal 408) may be provided from the controller circuit or the channel circuit. The laser enable signal 402 can enable the laser emitter to heat a portion of a data storage medium when the data storage device is to write data. The write enable signal 404 can enable the writing of data to the data storage medium while the laser is enabled. The reader power control signal 406 can indicate when the preamplifier is to reduce power to a reader element, thus controlling a read current supplied from the preamplifier circuit to the read element. For example, as shown, the reader power is low when the write enable is high when writing data.

In some embodiments, the preamplifier can control the laser level by logically comparing the input control lines, such as register bit representation 402, signal 404, and 406 resulting in signal 408 representing the laser level that indicates when a relatively high laser biasing current is to be applied to the laser emitter and when a relatively low laser biasing current is to be applied to the laser emitter.

In further embodiments, the preamplifier can control the laser level by monitoring a separate control line input from the controller or channel that is dedicated to switching the laser power level, the dedicated control line input can indicate when a relatively high laser biasing current is to be applied to the laser emitter and when a relatively low laser biasing current is to be applied to the laser emitter.

In some examples, a high laser bias current may be about 70% of total possible current to the laser emitter, and a low laser bias current may be about 20% of total possible current to the laser emitter. The biasing currents may change over time, and the system (either the preamplifier, the controller, or both) may initiate a laser bias current calibration routine to calibrate the amount of current to be applied when in the high state and low state.

In some examples, as shown, the system may chop (e.g. lower) the laser bias current while a read/write head is over a servo wedge, which can protect the servo data from being overwritten and also provide for power reduction and laser life extension. Thus, the control line (e.g. 236 and 406) to the preamplifier can control the switching of the laser bias current, allowing the laser bias current to modulate between two set laser values while the preamp is in read mode (e.g. programmable), where the frequency of oscillation is determined by the frequency of the external (to the preamplifier) control line toggling.

Such can be particularly useful in laser bias current calibration routines, as the bias current to the laser may need to be switched very quickly and accurately to determine the programmable settings for the next usage of the laser.

The systems and methods described herein allow for quickly switching between two registers that control the laser bias current, allowing for a more accurate modulation amplitude (e.g. between Lbias normal & Lbias low), which provides a more "honed in" (e.g. more precise) Lbias modulation range around the laser bias current threshold. This can be used for a sharper threshold detection for the laser bias current calibration routine.

While the above description includes some embodiments that describe data storage device implementations, the present disclosure can be applied to any system that needs to switch a laser current from a preamplifier. For example, the present disclosure can be utilized in any laser system that needs to switch an amount of power of a laser. Further, the elements of the different methods and systems described herein may be combined or modified.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a preamplifier circuit including:
      programmable registers to store bits that control functions of the preamplifier circuit,
      a first input dedicated to receive a first control signal indicating a specific register of the programmable registers to utilize for controlling a laser current output of the preamplifier circuit;
      a first control circuit configured to selectively change an amount of current at the laser current output of the preamplifier circuit based on the specific register;
      a first output configured to provide the laser current output to a laser emitter;
   a controller, coupled to the preamplifier circuit, including:
      a second control circuit configured to selectively vary the first control signal to affect the laser current output; and
      a second output configured to provide the first control signal to the first input.

2. The device of claim 1 further comprising the first control circuit configured to change the laser current output based on a logic circuit combination of multiple of the programmable registers that include a register to selectively enable external control of the laser current output of the preamplifier circuit based on the first control signal.

3. The device of claim 1 further comprising the preamplifier circuit including a second input configured to receive a serial input signal to program multiple registers of the programmable registers in response to serial data received over the second input.

4. The device of claim 1 further comprising:
   a data storage medium;
   the laser emitter configured to heat the data storage medium; and
   a transducer including a read element and a write element, the transducer configured to write data to and read data from the data storage medium.

5. The device of claim 4 further comprising the controller configured to detect a trigger event based on a write enable signal provided from the controller to the preamplifier circuit, the write enable signal controls a write current supplied from the preamplifier circuit to the write element.

6. The device of claim 5 further comprising the preamplifier circuit configured to detect the trigger event based on the write enable signal and a reader power signal provided from the controller to the preamplifier circuit, the reader power signal controls a read current supplied from the preamplifier circuit to the read element.

7. The device of claim 6 further comprising the trigger event occurs when the write enable signal is set to not write data and the reader power signal is set to provide power to the read element.

8. The device of claim 1 further comprising the controller configured to modulate the first control signal during a laser bias current calibration routine via switching the first control signal.

9. An apparatus comprising:
   a preamplifier circuit including:
      programmable registers to store bits that control functions of the preamplifier circuit, the programmable registers including multiple pre-programmable registers that can be pre-programmed with values to directly affect a laser current output of the preamplifier circuit;
      a first input dedicated to receive a first control signal to indicate to the preamplifier circuit a specific register of the programmable registers, the first input configured to switch which of the pre-programmable registers sets the laser current based on the specific register;
      a first control circuit configured to selectively implement an amount of current at a laser current output of the preamplifier circuit based on the specific register; and
      a first output configured to provide the laser current output to a laser emitter.

10. The apparatus of claim 9 further comprising:
    a controller coupled to the preamplifier circuit and including:

a second control circuit configured to selectively vary the first control signal to affect the laser current output; and a second output configured to provide the first control signal to the first input.

11. The apparatus of claim 10 further comprising:

a data storage medium;

the laser emitter configured to heat the data storage medium; and a transducer including a read element and a write element, the transducer configured to write data to and read data from the data storage medium.

12. The apparatus of claim 9 further comprising the preamplifier circuit configured to determine a trigger event and vary the laser current output in response to the trigger event.

13. The apparatus of claim 12 further comprising the preamplifier circuit configured to detect the trigger event based on a write enable signal provided from a control circuit to the preamplifier circuit via the first input, the write enable signal controls a write current supplied from the preamplifier circuit to a write element.

14. The apparatus of claim 9 further comprising the preamplifier circuit configured to detect a trigger event based on a write enable signal and a reader power signal provided from a controller to the preamplifier circuit, the write enable signal provided via the first input and controls a write current supplied from the preamplifier circuit to a data storage write element, the reader power signal provided by a second input to the preamplifier and controls a read current supplied from the preamplifier circuit to a data storage read element.

15. A method comprising:

receiving a control signal at a dedicated control line input of a preamplifier circuit, the preamplifier circuit configured to indicate a specific register of a set of programmable registers of the preamplifier circuit in response to the control signal;

receiving a serial programming signal at serial input of the preamplifier circuit, the preamplifier circuit configured to program multiple registers of the set of programmable registers of the preamplifier circuit in a serial fashion in response to the serial programming signal; and selectively switching an amount of current at a current output of the preamplifier circuit based on the specific register of the set of programmable registers; and providing the current output at an output of the preamplifier circuit, the output coupled to a laser emitter.

16. The method of claim 15 further comprising:

generating the control signal at a controller circuit; and providing the control signal to an output of the controller circuit coupled to control line input of the preamplifier circuit.

17. The method of claim 15 wherein the laser emitter is part of a heat assisted magnetic recording data storage device.

18. The method of claim 15 further comprising selectively switching the control signal between a high value and a low value to switch which register of the set of programmable registers affects the current output to modulate the current output of the preamplifier circuit.

19. The method of claim 18 further comprising performing the switching during a laser bias calibration routine to calibrate a laser bias current threshold of the laser current output.

* * * * *